United States Patent [19]
Workman et al.

[11] Patent Number: 6,009,042
[45] Date of Patent: Dec. 28, 1999

[54] MARINE SEISMIC WEB

[75] Inventors: Ricky L. Workman; Ronald E. Chambers, both of Houston, Tex.

[73] Assignee: Western Atlas International, Inc., Houston, Tex.

[21] Appl. No.: 09/057,934

[22] Filed: Apr. 9, 1998

[51] Int. Cl.[6] .................................................. G01V 1/38
[52] U.S. Cl. .............................. 367/15; 340/7; 114/244; 114/254
[58] Field of Search .................. 367/16, 20, 137, 367/56, 52, 15; 181/110; 114/244, 254; 340/7

[56] References Cited

U.S. PATENT DOCUMENTS

| | | | |
|---|---|---|---|
| 3,441,902 | 4/1969 | Savit | 367/56 |
| 4,319,347 | 3/1982 | Savit | 367/52 |
| 4,726,315 | 2/1988 | Bell et al. | 367/15 |
| 5,511,039 | 4/1996 | Flentge | 367/56 |
| 5,598,378 | 1/1997 | Flentge | 367/56 |

*Primary Examiner*—Christine K. Oda
*Assistant Examiner*—Anthony Jolly
*Attorney, Agent, or Firm*—Alan J. Atkinson

[57] ABSTRACT

A system for supporting marine seismic equipment such as sensors and positioning equipment deployed behind a marine seismic vessel. The vessel tows a lattice like web instead of individual streamer cables to carry hydrophones, and can deploy a geophone supporting web from the vessel to rest on the sea floor. The web can be formed with individual conductor members for providing structural support and signal transmission capabilities. The lattice construction of the web provides for redundant signal transmission capabilities in the event of individual conductor failure. The web provides this enhanced signal transmission capability while permitting high density sensor placement.

20 Claims, 2 Drawing Sheets

MARINE SEISMIC WEB

BACKGROUND OF THE INVENTION

The present invention relates to the field of marine seismic exploration. More particularly, the invention relates to a web structure towed behind a seismic vessel or deployed in water to support sensors and other marine seismic equipment, and for providing redundant signal transmission paths between the equipment and the vessel.

Marine seismic exploration vessels tow acoustic energy sources such as compressed air guns through the water. The vessel also tows one or more seismic streamer cables along a selected survey line. Each streamer contains multiple hydrophones which receive the reflected energy emitted by the energy source from subsurface geologic formations and boundaries. Each hydrophone generates signals representative of the reflected energy, and such signals are stored and processed to provide data representative of subsurface geologic structures. For bottom cable systems, geophones are laid on the sea floor along seismic cable lines. Data from adjacent seismic lines are processed to construct an overall geologic image. To account for vessel movement, data recording and processing calculations require time and position correlations for each active component of the seismic data gathering system.

Representative marine seismic systems were described in U.S. Pat. No. 3,133,262 to Strange et al. (1964) wherein a pair of wires transmitted signals from each hydrophone group to a connecting network, and in U.S. Pat. No. 3,441,902 to Savit (1969) wherein the array length and configuration of arrays in a streamer cable were changed to create different receiver patterns. In U.S. Pat. No. 4,319,347 to Savit (1982), a large number of sensor units and seismic arrays were established along the length of each seismic cable and the signals from adjacent vertical lines were combined to produce a cross section or composite geophysical survey of the target area. Additionally, U.S. Pat. No 4,545,039 to Savit (1985) disclosed the concept of operating two seismic vessels in parallel along a survey line to obtain three survey lines on each pass.

Advanced three dimensional seismic processing techniques require large quantities of data to provide high data resolution. The cell size of a processed data sampling determines the spatial frequency desired, and smaller cell sizes provide higher spatial frequency. As described in U.S. Pat. No. 5,511,039 to Flentge (1996), higher spatial frequencies provide higher seismic data resolution which correspondingly increases the resulting stratigraphic information quality. The ability to gather and process additional data facilitates reconstruction of the geologic image at any point in time.

Three dimensional marine seismic surveys typically incorporate multiple seismic lines comprising a plurality of uniformly spaced streamer receivers in parallel lines as described in U.S. Pat. No. 5,598,378 to Flentge (1997). The reflected signals are recorded and displayed in parallel traces along each streamer, and moveout and angularity corrections adjust the collected data. The streamers typically range between three and eight kilometers long, and tail buoys attached to the free streamer ends incorporate radar reflectors and navigation and acoustic transponders. Hydrophones in a streamer are typically wired together to form receiver groups regularly spaced along the streamer. The interval between receiver groups typically ranges between 12.5 and 6.25 meters, and the spacing between adjacent streamers typically comprises 50 meters. The relatively large spacing between adjacent streamers reduces streamer fouling due to crosscurrents, wind, and vessel course changes.

U.S. Pat. No. 4,726,315 to Bell et al. disclosed booms for towing multiple streamers behind a seismic vessel. When multiple streamers are towed, diverters typically pull the side positioned streamers outwardly from the vessel, and anchor buoys can maintain tension against each streamer. If the streamers are not adequately separated, the streamers can become entangled when the streamers are deployed, used, or retrieved. Ocean currents, waves and vessel course changes can vary the streamer orientation during use. Streamer entanglement risks increase in long streamers and in arrays having multiple streamers.

Variations in the lateral spacing between adjacent streamers due to environmental forces and vessel course changes introduces variables in the collected data. The spacing between receiver groups along a streamer and between streamers is critical to the analysis of geophysical data, and is important to surface and subsurface criteria. The surface criteria regarding receiver groups is important to the accurate recordation of reflected seismic signals and to various noise interfering with such signals. The acoustic wavefield is more accurately represented when the receiver groups are more closely spaced together. The amount of "aliasing" experienced, defined as the natural approximations made in sampling processes for time or space, also depends on the spacing of receiver groups. In coarse sampling with a greater distance between receiver groups, more of the wavefield is aliased and the data quality is reduced.

The amount of aliasing is critical to the successful attenuation of noises interfering with the desirable reflected seismic energy. Aliasing effects can modify the recorded signals and are especially disruptive for reflections from shallow or steeply dipping geologic formations such as the flanks of geologic structures or salt bodies. Although conventional streamers can provide fine sampling along an individual streamer line, the relatively large spacing between adjacent streamers limits effective noise attenuation processes and reduces the fidelity of reflected signals at higher frequencies and steep dips.

The quality of seismic maps created from processing techniques such as stacking, normal-moveout correction, dip moveout correction and migration also depends partially on the bin size. Smaller bin sizes are prevented by the safe spacing limits between adjacent seismic streamers. Subsurface sampling criteria regarding receiver groups depends on several other factors, and receiver group spacing determines the bin size into which recorded data are collected and processed to form subsurface images. For complex and steeply dipping subsurface formations, receiver group spacings are preferably smaller to preserve the desired signals. Smaller spacings are required to adequately perform image formation processes such as Dip Moveout and Time or Depth Migration processes.

In addition to the between-streamer spacing limitations necessary to avoid streamer fouling, the reliability of conventional streamer systems is limited to the data path transmission capabilities of each streamer. Data is frequently transmitted to recording instrumentation on the seismic vessel through an electrical wire or optical fiber attached to or integrally formed within each streamer. If the signal communication medium is damaged along the streamer path, all of the data from the streamer will be lost and seismic data collection operations must be discontinued to permit repair of the damaged streamer.

For these reasons, a need exists for an improved data collection system in marine seismic exploration operations towed behind a vessel or deployed along the sea floor. The system should enhance the accuracy of data processing and the data collection and processing reliability of the geophysical operations.

SUMMARY OF THE INVENTION

The present invention provides a unique system for supporting marine seismic equipment towed in water behind a seismic vessel or otherwise deployed on the sea floor. The invention comprises a web means formed with a plurality of members formed in a selected lattice pattern defined by an outer boundary. The web means supports the seismic equipment as the vessel tows the web means in the water. Alternatively, the web can be deployed behind a seismic vessel to rest on the sea floor.

In different embodiments of the invention, the web means lattice pattern provides a substantially uniform spacing between each of the members, and the equipment can comprise hydrophones uniformly spaced apart. At least two of the members can comprise conductors for transmitting signals between the vessel and the equipment in the form of electrical or fiber optic signals. If one of the conductors is damaged, a controller engaged with the conductors can monitor the signal transmission to control the signal transmission through different transmission paths.

In other embodiments of the invention, the web means can support hydrophones, geophones or other sensors for generating signals representing seismic source energy reflected from geologic formations underlying the water. Equipment engaged with the web means can transmit signals indicating sensor coordinate position or elevation, and the controller can calculate the relative position of other sensors.

DESCRIPTION OF THE PREFERRED EMBODIMENTS

Figure 1:
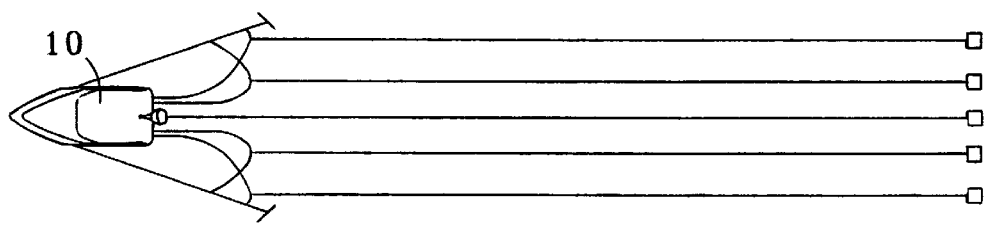
FIG. 1 illustrates a conventional streamer system.

The present invention provides a unique system for supporting equipment behind a marine seismic vessel, for deploying sensors on the sea floor behind a seismic vessel, and for transmitting signals between the vessel and towed equipment seismic equipment through redundant signal transmission paths. Referring to FIG. 1, a conventional combination of streamers is towed behind marine seismic vessel 10 in water 12. Diverters pull laterally disposed streamers away from the centerline of vessel 10, and tailbuoys maintain tension on each streamer. The relatively large lateral spacing between adjacent streamers reduces the risk of streamer fouling as previously described.

Figure 2:
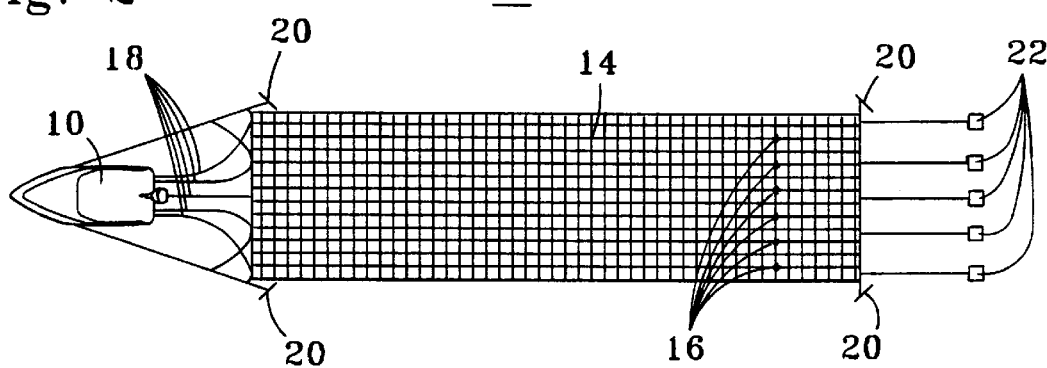
FIG. 2 illustrates a marine seismic web for supporting hydrophones and other equipment.

The invention provides a significantly different concept for supporting equipment behind a seismic vessel. The invention further reduces the lateral spacing between seismic equipment, maintains the relative position of such equipment, and provides redundant signal transmission paths. FIG. 2 illustrates web 14 towed in water 12 behind vessel 10. In one embodiment of the invention, web 14 is formed with a plurality of individual members and provides a base for supporting equipment such as hydrophones and other seismic equipment 16. In another embodiment of the invention, web 14 can generally comprise a unitary planar material such as a sheet, film-like, or woven material. Primary umbilical cables 18 are attached between web 14 and vessel 10, diverters 20 maintain the lateral spread of web 14, and diverters 20 or tail buoys 22 maintain tension on the free end of web 14. As illustrated in FIG. 2, a representative length of web 14 can be six kilometers, a representative width can be one kilometer, and a representative spacing between individual web 14 members can be five meters. Conventional streamer systems are unable to provide this close spacing and equipment 16 placement, and other configurations, dimensions and forms of web 14 can be made to meet selected design criteria.

As used herein, the terms "web" or "web means" are defined as a plurality of members formed in a selected lattice pattern having an outer boundary. The outer boundary can have a geometrical shape or can be irregular. The inner parts of web 14 within the outer boundary can be uniform in composition or can incorporate open areas for reducing frictional drag of web 14 in water 12. The usage of the term "web" describes an interlocking system having at least two paths linked along the length of the individual lines. Web 14 can comprise a latticed or woven structure or framework, and can define many different shapes and configurations. Web 14 provides a latticed or complex structure which provides a network for supporting various marine seismic equipment such as hydrophones, geophones and other sensors, depth gauges or other seismic acquisition components generally identified herein as seismic equipment 16. As shown in FIG. 2, the outer boundary of web 14 can be substantially rectangular or can comprise different shapes as described. Web 14 preferably provides the function of supporting seismic equipment such as hydrophones, geophones, transponders, depth gauges, coordinate positioning equipment such as global position satellite (GPS), seismic energy sources such as air guns, and other seismic exploration equipment 16. If web 14 is submerged below the water surface as web 14 is towed through the water or is stationary on the sea floor, signals can be transmitted to buoys floating at the water surface for relaying the signals to vessel mounted or land based receiving equipment. In addition to other functions, equipment 16 can provide relevant data regarding the x, y and z coordinates of web 14 and of various components described as equipment 16.

The "lattice" composition of web 14 provides an integral structure covering a defined surface area having outer boundaries while preserving an internal structural and functional integrity. Web 14 can be deployed, towed, and retrieved from water 12 with conventional fishing net techniques. The individual members of web 14 provide connecting strength, with a minimal material mass, to cover the area within the outer web 14 boundary. The form and construction of web 14 is preferably designed to provide minimal water resistance as vessel 10 tows 14 through water 12.

Diverters 20 stretch web 14 laterally relative to the centerline of vessel 10, and diverters 20 or tail buoys 22 maintain a selected tension to maintain the desired shape of web 14. Diverters 20 and tail buoys 22 maintain sufficient tension in web 14 to reduce the possibility of web 14 distortion caused by waves, currents, variations in vessel 10 course or speed, and other factors. The sheet structure or individual members of web 14 provide a latticework frame which also maintains overall stability of web 14 configuration as each member resists deformation of adjacent members. Each member provides a counteracting force acting against adjacent members to maintain the overall shape and configuration of web 14. The inertia of individual sections of web 14, and the drag forces acting against web 14, also tend to maintain the overall configuration and shape of web 14.

In other embodiments of the invention, diverters 20 and tail buoys 22 can be replaced by modifications to the members and shape of web 14. Semi-rigid strength members and other components can be combined with or integrated into web 14 to facilitate the maintenance of web 14 shape.

Figure 3:
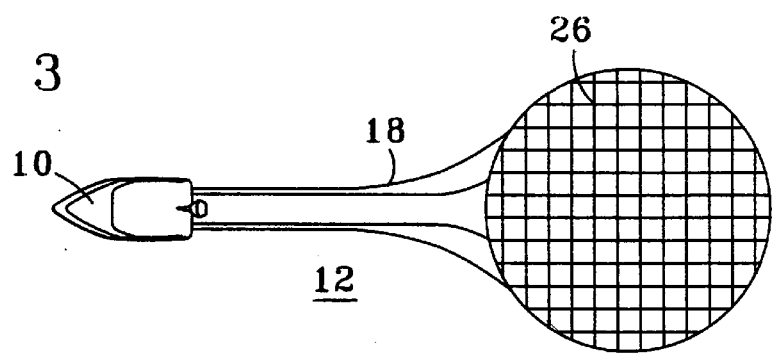
FIG. 3 illustrates another configuration of a marine seismic web.

FIG. 3 illustrates another embodiment of the invention wherein the outer boundary or perimeter of web 26 is circular. As illustrated by this example, the outer boundary of web 26 can be shaped in different configurations other than a rectangle, and can be oblique, polygonal, or irregular in shape. The particular shape of web 26 can be formed depending on the desired placement of hydrophones and other equipment 16, and on the direction and length of selected data acquisition lines and patterns selected for the seismic exploration system. Web 26 uniquely provides configurations and equipment 16 placements not possible with conventional streamer lines. By controlling the placement of hydrophones 16 at different spacings, including clusters and other selected configurations, data collected from hydrophones 16 can be processed along different lines within the web 14 shape.

Figure 4:
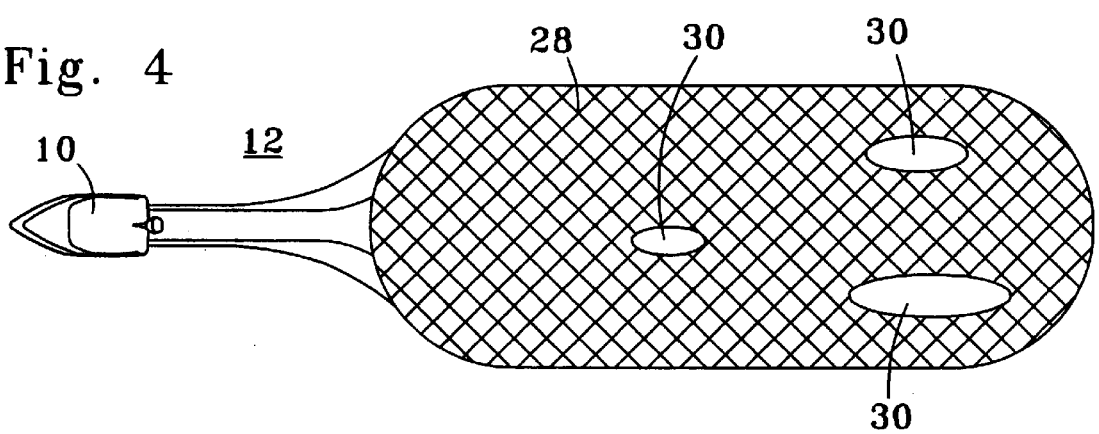
FIG. 4 illustrates a marine seismic web having members aligned on a diagonal path.

FIG. 4 illustrates another embodiment of the invention wherein the individual members of web 28 are aligned diagonal to the direction of vessel 10 travel. This configuration of the individual web 28 members reduces water 12 drag forces acting against web 28 by reducing surfaces perpendicular to the travel direction of vessel 10, while maintaining a rectangular latticework or grid pattern for the placement of equipment 16. Openings 30 are strategically positioned within web 28 to further reduce drag forces acting on web 28.

Figure 5:
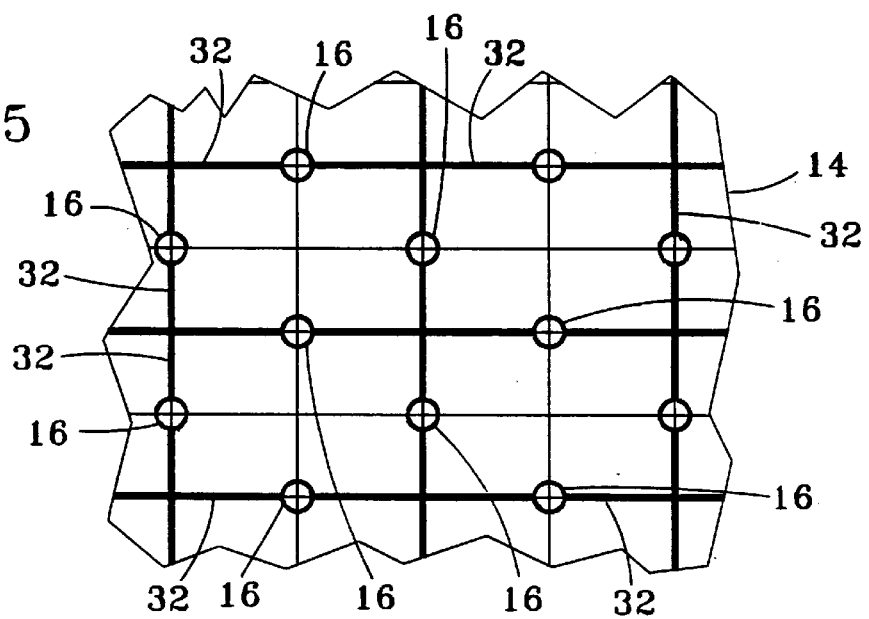
FIG. 5 illustrates a schematic view of a redundant communication path between a hydrophone and a controller.

FIG. 5 illustrates the unique data transmission capabilities of the invention. A planar section of web 14 is illustrated wherein equipment 16 transmits electrical or optical signals through conductors 32. Conductors 32 comprise individual members within web 14 and are contained with nonconductive webbing structures 34. Switches 36 connect conductors 32 and provide redundant signal transmission paths between equipment 16 and vessel 10. If a particular conductor 32 becomes damaged, switches 36 or other control equipment can detect the conductor 32 failure and can switch signal transmission to adjacent conductors 32.

The unique structure of web 14 integrally provides this redundant data transmission capability for equipment 16. Consequently, conductor 32 failure will not require cessation of seismic operations, and data is not lost as vessel 10 moves through water 12. If web 14 is formed as an integral sheet, individual conductors 32 can be entrained within the sheet form to provide multiple signal transmission paths. Conductors 32 can transmit data in digital or analog form, and can connect conventional hydrophones comprising any pressure sensing device suitable for marine use. Hydrophones 16 can comprise common piezoelectric crystals, ceramic benders, or flextensional sensors. Implementation of web 14 is particularly suited to fiber optic methods wherein the telemetry conductor 32 is fiber optic and the receivers 16 comprise fiber optic devices such as interferometric and Bragg grating sensors.

As vessel 10 tows web 14 through water 12, data is collected by equipment 16 and can be transmitted through conductors 32. In other embodiments of the invention, web 14 can provide the structural integrity to maintain equipment spacing and orientation, while data transmission is performed through wireless techniques. After the data is recorded by components located in water 12, on vessel 10, or by remote land based facilities linked by satellite transmission systems, the data can be processed to derive seismic information regarding strike, dip, velocity and related information. Beam steering techniques can be used to coordinate signal stacking and general reduction of signal-to-noise ratios, signal compilations, and other conventional processing techniques. By preserving the relative orientation of individual equipment 16 components, and by facilitating accurate recording of the x, y and z data for equipment 16, web 14 significantly reduces the data processing required and provides higher accuracy in the processed data results.

The implementation of web 14 significantly increases the number of available receiver groups in a seismic data gathering system, and advanced instrumentation, high density tape, and data compression technologies facilitate processing of the collected data. Finer and more regular data sampling and multiple telemetry paths are provided by web 14. The close proximity of signals from adjacent receiver groups enhances the compressibility of collected data, and the dense spatial sampling provided by web 14 significantly improves array forming and beam steering of numerous receiver signals into a lesser number of signals. This feature will improve the signal to noise ratio, and this processing can be performed during seismic data gathering operations as the data is being conditioned for recording, after recording in the field, or in remote computing centers.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A marine seismic acquisition system having seismic equipment deployable in water from a vessel, comprising:
a web, comprising a plurality of members formed in a selected lattice pattern defined by an outer boundary, for orienting the seismic equipment in the water.

2. A system as recited in claim 1, wherein said lattice pattern provides substantially uniform spacing between each of said members.

3. A system as recited in claim 1, wherein the seismic equipment includes hydrophones, and wherein the hydrophones are attached to said web with a uniform spacing.

4. A system as recited in claim 1, wherein at least two of said members comprise conductors for transmitting signals between the equipment and the seismic vessel.

5. A system as recited in claim 4, wherein said conductors provide multiple redundant communication paths between the equipment and the seismic vessel.

6. A system as recited in claim 4, wherein said conductors comprise electrical conductors for transmitting electricity between the equipment and the seismic vessel.

7. A system as recited in claim 4, wherein said conductors comprise telemetry conductors for transmitting fiber optic signals between the equipment and the seismic vessel.

8. A system as recited in claim 4, further comprising a controller for monitoring transmission of said signals.

9. A system as recited in claim 8, further comprising a switch engaged with said controller and said conductors for selectively switching signals from one conductor to another.

10. A system as recited in claim 8, wherein said web is attached to and is towed through the water by the vessel.

11. A system as recited in claim 8, wherein said controller is capable of storing signals transmitted from the equipment through said conductors.

12. A system attachable to a seismic vessel for collecting marine seismic data, comprising:
   a web, comprising a plurality of members formed in a selected lattice pattern defined by an outer boundary;
   a plurality of hydrophones positioned at selected intervals on said web;
   a controller attached to the seismic vessel; and
   a conductor for transmitting signals between said hydrophones and said controller.

13. A system as recited in claim 12, wherein said conductor comprises at least one of the members in said web.

14. A system attachable to a seismic vessel for collecting marine seismic data, comprising:
   a web comprising a plurality of members formed in a selected lattice pattern defined by an outer boundary;
   a plurality of hydrophones positioned at selected intervals on said web which are capable of transmitting a fiber optic signal;
   a controller attached to the seismic vessel; and
   a fiber optic conductor for transmitting signals between said hydrophones and said controller.

15. A system as recited in claim 12, wherein said web is capable of retaining the selected intervals between said hydrophones, and further comprising a positioning device for identifying the position of at least one hydrophone and for transmitting a signal representative of such position through said conductor to said controller.

16. A system operable with a marine seismic vessel for collecting geophysical seismic data representative of subsurface geologic formations underlying the water, comprising:
   a seismic energy source for generating acoustic energy reflectable from the geologic formations;
   a web towable in the water behind the seismic vessel, wherein said web comprises a plurality of members formed in a selected lattice pattern defined by an outer boundary;
   a plurality of hydrophones positioned at selected intervals on said web for generating signals representative of the acoustic energy reflected from the geologic formations;
   a controller; and
   a conductor for transmitting said hydrophone signals to said controller.

17. A system as recited in claim 16, wherein said web is capable of retaining the selected intervals between said hydrophones, and further comprising equipment engaged with said web for identifying the position of at least one hydrophone and for transmitting a signal representative of such position through said conductor to said controller.

18. A system as recited in claim 17, wherein said controller is capable of calculating the relative position of another hydrophone relative to the hydrophone position identified by said equipment.

19. A system as recited in claim 17, wherein said equipment transmits a signal to said controller representing the absolute coordinate position of said hydrophone.

20. A system as recited in claim 17, wherein said equipment transmits a signal to said controller representing the depth of said hydrophone in the water.

* * * * *